United States Patent
Kuranoshita

(10) Patent No.: US 9,245,216 B2
(45) Date of Patent: Jan. 26, 2016

(54) IMPOSING APPARATUS, IMPOSING METHOD, AND NON-TRANSITORY STORAGE MEDIUM

(71) Applicant: FUJIFILM Corporation, Tokyo (JP)

(72) Inventor: Masashi Kuranoshita, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/535,497

(22) Filed: Nov. 7, 2014

(65) Prior Publication Data

US 2015/0138602 A1    May 21, 2015

(30) Foreign Application Priority Data

Nov. 19, 2013   (JP) .................. 2013-238996

(51) Int. Cl.
   *G06F 15/00*    (2006.01)
   *G06K 15/02*    (2006.01)

(52) U.S. Cl.
   CPC ........ *G06K 15/1885* (2013.01); *G06K 15/1836* (2013.01)

(58) Field of Classification Search
   CPC .................. G06K 15/1885; G06K 15/1836
   USPC ........................................... 358/1.18
   See application file for complete search history.

(56) References Cited

U.S. PATENT DOCUMENTS

2005/0162698 A1* 7/2005 Nishide .................. G06K 15/02
                                                       358/1.18

FOREIGN PATENT DOCUMENTS

JP         09-011446 A      1/1997

OTHER PUBLICATIONS

PDF reference, second edition, Adobe Portable Document Format Version 1.3, first edition, first print, published Sep. 25, 2001, Authors: AdobeSystems, ISBN 4-89471-338-1, pp. 452-454.
Communication from the Japanese Patent Office issued Nov. 4, 2015 in a counterpart Japanese Patent Application No. 2013-238996.

* cited by examiner

*Primary Examiner* — Saeid Ebrahimi Dehkordy
(74) *Attorney, Agent, or Firm* — Sughrue Mion, PLLC

(57) ABSTRACT

An imposing apparatus determines at least one pair of line components included in positioning marks based on the positional relationship between particular line components in a page region, and estimates marking positions for the positioning marks based on the shape of the pair of line components. The imposing apparatus acquires the marking positions as positional information of a page box in association with the page region.

8 Claims, 14 Drawing Sheets

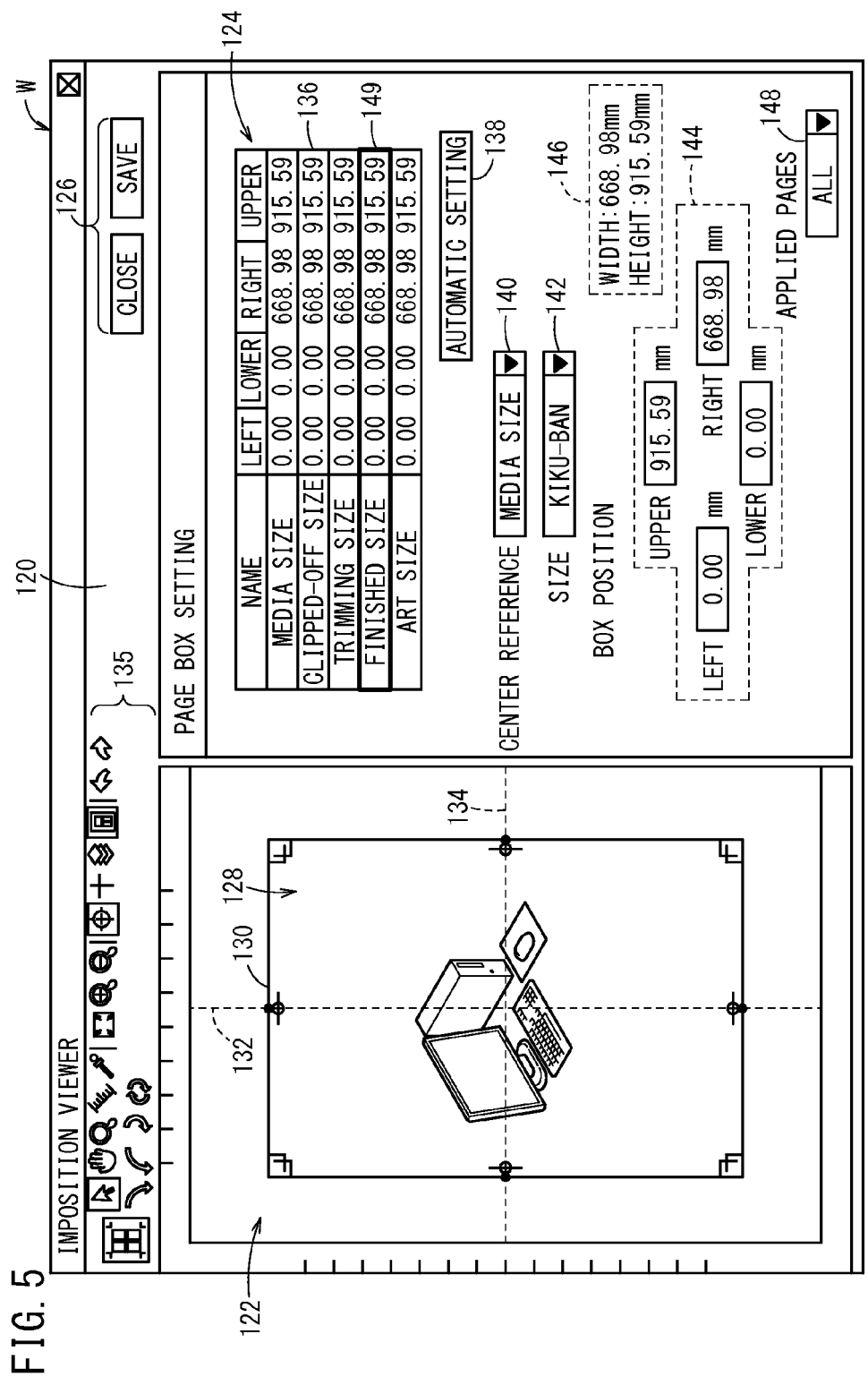

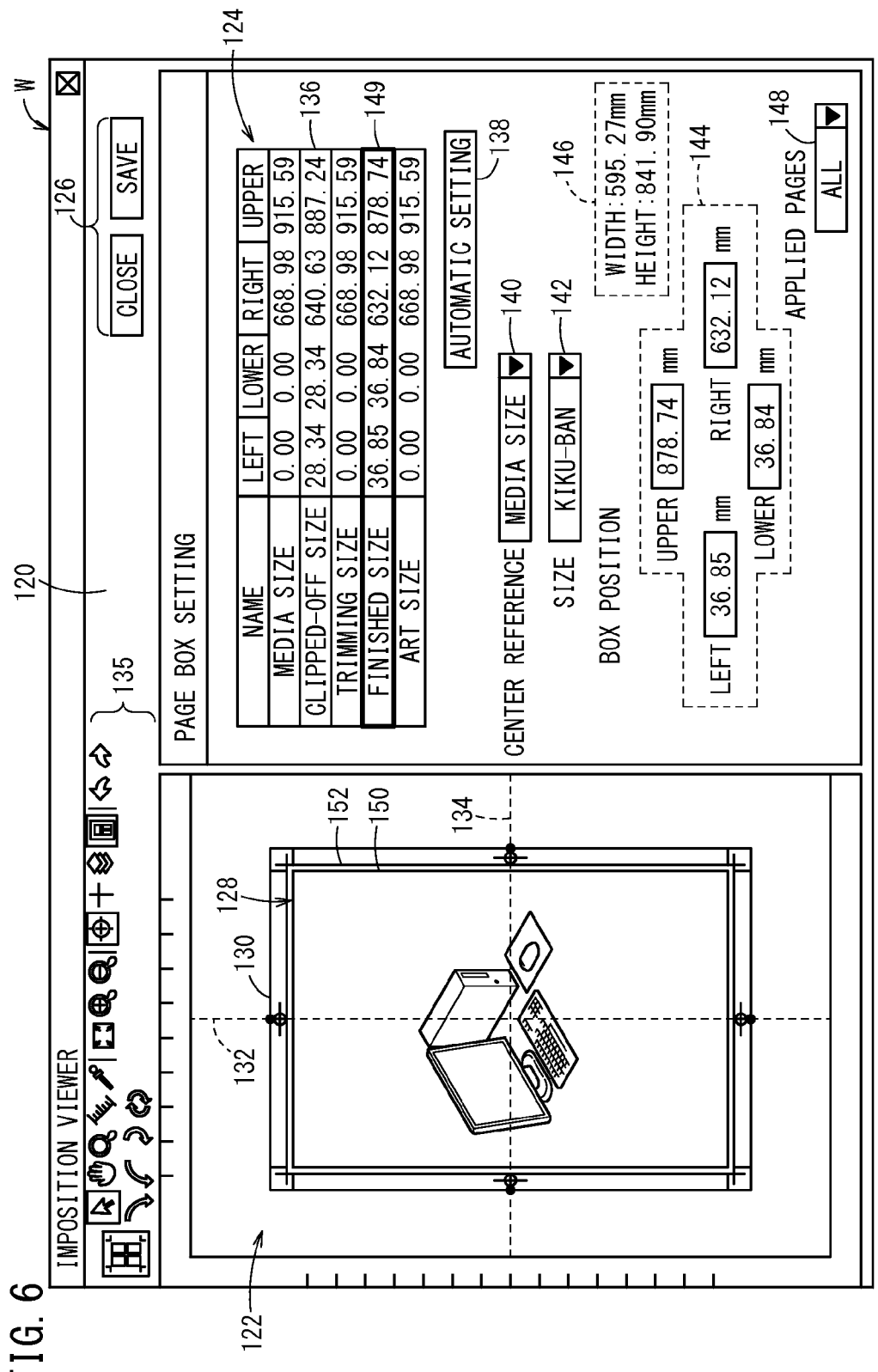

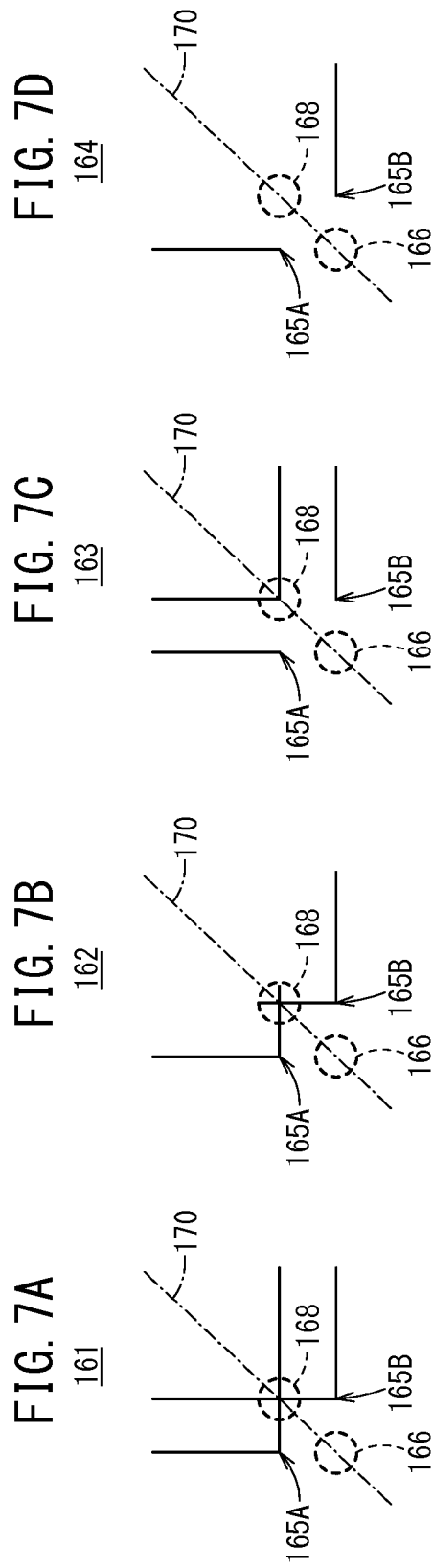

FIG. 10A

FIRST END POINT (x, y)     SECOND END POINT (x, y)

⟨VERTICAL LINE COMPONENTS⟩

| | | First End Point | Second End Point |
|---|---|---|---|
| 104a | { | (28.3459, 878.74) | , 28.3459, 907.086) |
| | | ( 36.85, 887.244) | , 36.85, 915.59) |
| 104b | { | (632.125, 887.244) | , 632.125, 915.59) |
| | | ( 640.63, 878.74) | , 640.63, 907.086) |
| 104c | { | (632.125, 0) | , 632.125, 28.3457) |
| | | ( 640.63, 8.50371) | , 640.63, 36.8497) |
| 104d | { | (28.3459, 8.50371) | , 28.3459, 36.8497) |
| | | ( 36.85, 0) | , 36.85, 28.3457) |
| 107a | | (334.488, 887.244) | , 334.488, 915.59) |
| 107b | | (334.488, 0) | , 334.488, 28.346) |
| 107c | | ( 14.173, 429.449) | , 14.173, 486.141) |
| 107d | | (654.802, 429.449) | , 654.802, 486.141) |

⟨HORIZONTAL LINE COMPONENTS⟩

| | | First End Point | Second End Point |
|---|---|---|---|
| 104a | { | ( 0, 878.74) | , 28.346, 878.74) |
| | | (8.50389, 887.244) | , 36.8499, 887.244) |
| 104b | { | (632.126, 887.244) | , 660.472, 887.244) |
| | | (640.629, 878.74) | , 668.975, 878.74) |
| 104c | { | (632.126, 28.3457) | , 660.472, 28.3457) |
| | | (640.629, 36.8497) | , 668.975, 36.8497) |
| 104d | { | ( 0, 36.8497) | , 28.346, 36.8497) |
| | | (8.50389, 28.3457) | , 36.8499, 28.3457) |
| 107a | | (306.142, 901.417) | , 362.834, 901.417) |
| 107b | | (306.142, 14.173) | , 362.834, 14.173) |
| 107c | | ( 0, 457.795) | , 28.346, 457.795) |
| 107d | | (640.63, 457.795) | , 668.976, 457.795) |

FIG. 10B

FIRST END POINT (x, y)     SECOND END POINT (x, y)

⟨VERTICAL LINE COMPONENTS⟩

| | | First End Point | Second End Point |
|---|---|---|---|
| 104a | { | (28.3459, 878.74) | , 28.3459, 907.086) |
| | | ( 36.85, 887.244) | , 36.85, 915.59) |
| 104b | { | (632.125, 887.244) | , 632.125, 915.59) |
| | | ( 640.63, 878.74) | , 640.63, 907.086) |
| 104c | { | (632.125, 0) | , 632.125, 28.3457) |
| | | ( 640.63, 8.50371) | , 640.63, 36.8497) |
| 104d | { | (28.3459, 8.50371) | , 28.3459, 36.8497) |
| | | ( 36.85, 0) | , 36.85, 28.3457) |
| 107a | | (334.488, 887.244) | , 334.488, 915.59) |
| 107b | | (334.488, 0) | , 334.488, 28.346) |
| 107c | | ~~( 14.173, 429.449)~~ | ~~, 14.173, 486.141)~~ |
| 107d | | ~~(654.802, 429.449)~~ | ~~, 654.802, 486.141)~~ |

⟨HORIZONTAL LINE COMPONENTS⟩

| | | First End Point | Second End Point |
|---|---|---|---|
| 104a | { | ( 0, 878.74) | , 28.346, 878.74) |
| | | (8.50389, 887.244) | , 36.8499, 887.244) |
| 104b | { | (632.126, 887.244) | , 660.472, 887.244) |
| | | (640.629, 878.74) | , 668.975, 878.74) |
| 104c | { | (632.126, 28.3457) | , 660.472, 28.3457) |
| | | (640.629, 36.8497) | , 668.975, 36.8497) |
| 104d | { | ( 0, 36.8497) | , 28.346, 36.8497) |
| | | (8.50389, 28.3457) | , 36.8499, 28.3457) |
| 107a | | ~~(306.142, 901.417)~~ | ~~, 362.834, 901.417)~~ |
| 107b | | ~~(306.142, 14.173)~~ | ~~, 362.834, 14.173)~~ |
| 107c | | ( 0, 457.795) | , 28.346, 457.795) |
| 107d | | (640.63, 457.795) | , 668.976, 457.795) |

FIG. 12

|  | FIRST END POINT(x, y) | SECOND END POINT(x, y) | FIRST INTERCEPT(b) | SECOND INTERCEPT(b) |
|---|---|---|---|---|
| <VERTICAL LINE COMPONENTS> | | | | |
| 104a | (28.3459, 878.74 , 28.3459, 907.086), | | (907.086, | 935.432) |
|  | ( 36.85, 887.244 , 36.85, 915.59), | | (924.094, | 952.44) |
| 104b | (632.125, 887.244 , 632.125, 915.59), | | (1519.37, | 1547.71) |
|  | ( 640.63, 878.74 , 640.63, 907.086), | | (1519.37, | 1547.72) |
| 104c | (632.125, 0 , 632.125, 28.3457), | | (632.125, | 660.471) |
|  | ( 640.63, 8.50371 , 640.63, 36.8497), | | (649.134, | 677.48) |
| 104d | (28.3459, 8.50371 , 28.3459, 36.8497), | | (36.8496, | 65.1956) |
|  | ( 36.85, 0 , 36.85, 28.3457), | | (36.8497, | 65.1957) |
| 107a | (334.488, 887.244 , 334.488, 915.59), | | (1221.73, | 1250.08) |
| 107b | (334.488, 0 , 334.488, 28.346), | | (334.488, | 362.834) |
| <HORIZONTAL LINE COMPONENTS> | | | | |
| 104a | ( 0, 878.74 , 28.346, 878.74), | | ( 878.74, | 907.086) |
|  | (8.50389, 887.244 , 36.8499, 887.244), | | (895.748, | 924.094) |
| 104b | (632.126, 887.244 , 660.472, 887.244), | | (1519.37, | 1547.72) |
|  | (640.629, 878.74 , 668.975, 878.74), | | (1519.37, | 1547.71) |
| 104c | (632.126, 28.3457 , 660.472, 28.3457), | | (660.472, | 688.818) |
|  | (640.629, 36.8497 , 668.975, 36.8497), | | (677.479, | 705.825) |
| 104d | ( 0, 36.8497 , 28.346, 36.8497), | | (36.8497, | 65.1957) |
|  | (8.50389, 28.3457 , 36.8499, 28.3457), | | (36.8496, | 65.1956) |
| 107c | ( 0, 457.795 , 28.346, 457.795), | | (457.795, | 486.141) |
| 107d | (640.63 , 457.795 , 668.976, 457.795), | | (1098.42, | 1126.77) |

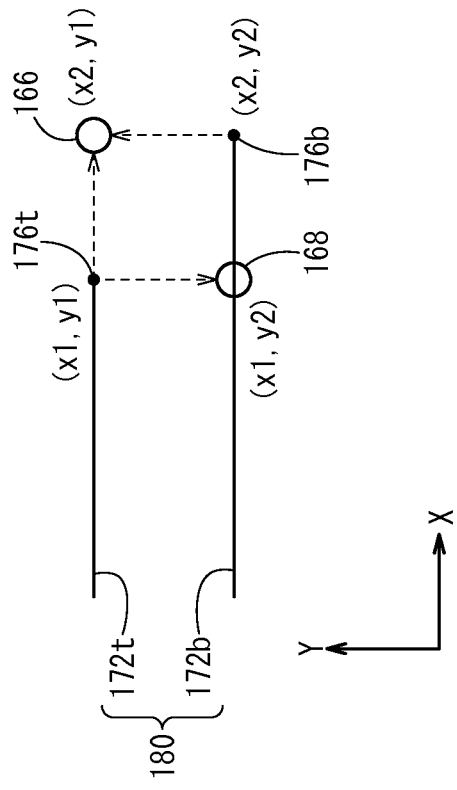
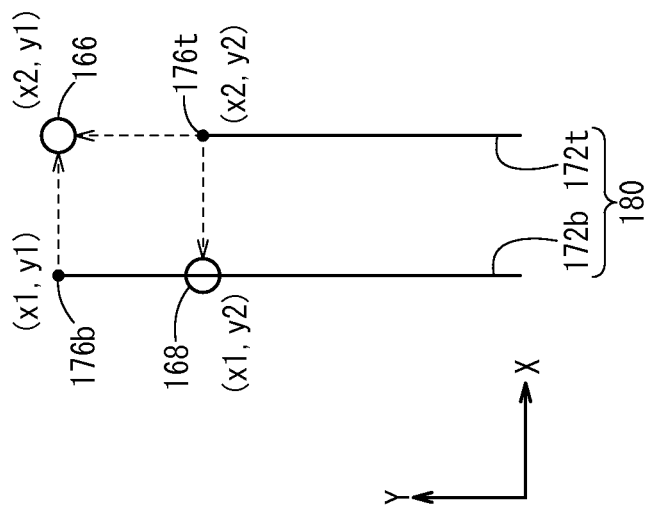

IMPOSING APPARATUS, IMPOSING METHOD, AND NON-TRANSITORY STORAGE MEDIUM

CROSS-REFERENCE TO RELATED APPLICATION

This application is based upon and claims the benefit of priority from Japanese Patent Application No. 2013-238996filed on Nov. 19, 2013, the contents of which are incorporated herein by reference.

BACKGROUND OF THE INVENTION

1. Field of the Invention

The present invention relates to an imposing apparatus, an imposing method, and a storage medium storing a program for setting, for each page region, a page box that specifies the boundaries of a page.

2. Description of the Related Art

Recently, the computer to plate (CTP) technology for directly producing printing plates from electronic data without the need for the generation of any intermediate products has been in widespread use in the printing and platemaking fields. There have been an increasing number of cases where a designer creates contents using an information processing terminal and then provides the created contents as electronic data to a printing company. Portable document format (PDF) version 1.3, which represents a type of page description data, for example, defines five types of "page box" as a parameter that defines the boundaries of pages in order to assist in a prepress production workflow (see PDF reference, second edition, Adobe Portable Document Format Version 1.3, first edition, first print, published Sep. 25, 2001, Authors: Adobe-Systems, ISBN 4-89471-338-1, pages 452-454). An operator who belongs to the printing company can use "page box" in carrying out an electronic imposition process.

SUMMARY OF THE INVENTION

A page box refers to a type of independent parameter that is different from contents (form of painting) arranged in page regions. On condition that an ignorant designer submits a manuscript without setting a page box or that a page box cannot be set because of the operating environment of an information processing terminal used, then settings suitable for printing are not entered. In a case where no settings are entered, the operator who has received electronic data needs to correct page box settings each time it has received electronic data. Such a process is highly tedious and time-consuming for the operator.

The present invention has been made in order to solve the above problems. It is an object of the present invention to provide an imposing apparatus, an imposing method, and a storage medium storing a program for setting a page box automatically and accurately.

According to the present invention, there is provided an imposing apparatus for setting, for each page region, a page box that specifies boundaries of a page, comprising a line component extractor for extracting a plurality of particular line components from within the page region, a line component pair determiner for determining at least one pair of line components included in positioning marks based on a positional relationship between the particular line components extracted by the line component extractor, a marking position estimator for estimating marking positions for the positioning marks based on a shape of the pair of line components determined by the line component pair determiner, and a box position acquirer for acquiring the marking positions estimated by the marking position estimator as positional information of the page box in association with the page region.

As described above, at least one pair of line components included in positioning marks is determined based on the positional relationship between the line components, and marking positions for the positioning marks are estimated based on the shape of the pair of line components. Generally speaking, the positioning marks have a form including the pair of line components, and perform a function to mark a two-dimensional position based on end points, points of intersection, etc. thereof. Using these geometric features, the marking positions can be detected to a nicety even though the positioning marks are of different forms, and a page box can be set automatically and accurately.

The line component extractor should preferably extract line components which extend along a horizontal direction or a vertical direction in the page region as the particular line components, and the line component pair determiner should preferably determine the pair of line components where an angle formed between a straight line interconnecting end points of two of the particular line components and the horizontal direction is 45 degrees.

The line component pair determiner should preferably determine the pair of line components on condition a distance between two of the end points is smaller than a threshold value.

The line component pair determiner should preferably determine the pair of line components where two of the particular line components are parallel to each other. Alternatively, the line component pair determiner should preferably determine the pair of line components where two of the particular line components are perpendicular to each other.

The box position acquirer should preferably acquire the positional information of the page box which specifies at least one of a clipped-off region and a finished region.

According to the present invention, there is also provided a method of setting, for each page region, a page box that specifies boundaries of a page, the method enabling a computer to perform the steps of extracting a plurality of particular line components from within the page region, determining at least one pair of line components included in positioning marks based on a positional relationship between the extracted particular line components, estimating marking positions for the positioning marks based on a shape of the determined pair of line components, and acquiring the estimated marking positions as positional information of the page box in association with the page region.

According to the present invention, there is further provided a non-transitory storage medium storing an imposing program for setting, for each page region, a page box that specifies boundaries of a page, the imposing program enabling a computer to perform the steps of extracting a plurality of particular line components from within the page region, determining at least one pair of line components included in positioning marks based on a positional relationship between the extracted particular line components, estimating marking positions for the positioning marks based on a shape of the determined pair of line components, and acquiring the estimated marking positions as positional information of the page box in association with the page region.

With the imposing apparatus, the imposing method, and the storage medium according to the present invention, at least one pair of line components included in positioning marks is determined based on the positional relationship between the line components, and marking positions for the positioning marks are estimated based on the shape of the pair of line components. Generally speaking, the positioning marks have a form including the pair of line components, and perform a function to mark a two-dimensional position based on end points, points of intersection, etc. thereof. Using these geometric features, the marking positions can be detected to a nicety even though the positioning marks are of different forms, and a page box can be set automatically and accurately.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a view showing a first image that represents a setting screen for a page box;

FIG. 6 is a view showing a second image that represents a setting screen for a page box;

FIGS. 7A through 7D are enlarged plan views of typical positioning marks;

FIG. 10A is a diagram showing the coordinates of a first end point and a second end point that specify each of the particular line components;

FIG. 10B is a diagram showing the coordinates of a first end point and a second end point with some coordinates being excluded according to prescribed rules;

FIG. 12 is a diagram showing a first intercept and a second intercept that are obtained according to the calculating process illustrated in FIG. 11;

FIGS. 14A and 14B are schematic diagrams illustrating processes of estimating marking positions based on the shapes of pairs of line components.

DESCRIPTION OF THE PREFERRED EMBODIMENTS

An imposing method according to a preferred embodiment of the present invention in relation to an imposing apparatus for carrying out the imposing method and a storage medium storing an imposing program will be described in detail below with reference to the accompanying drawings.

[Overall Configuration of Print Production System 10]

Figure 1:
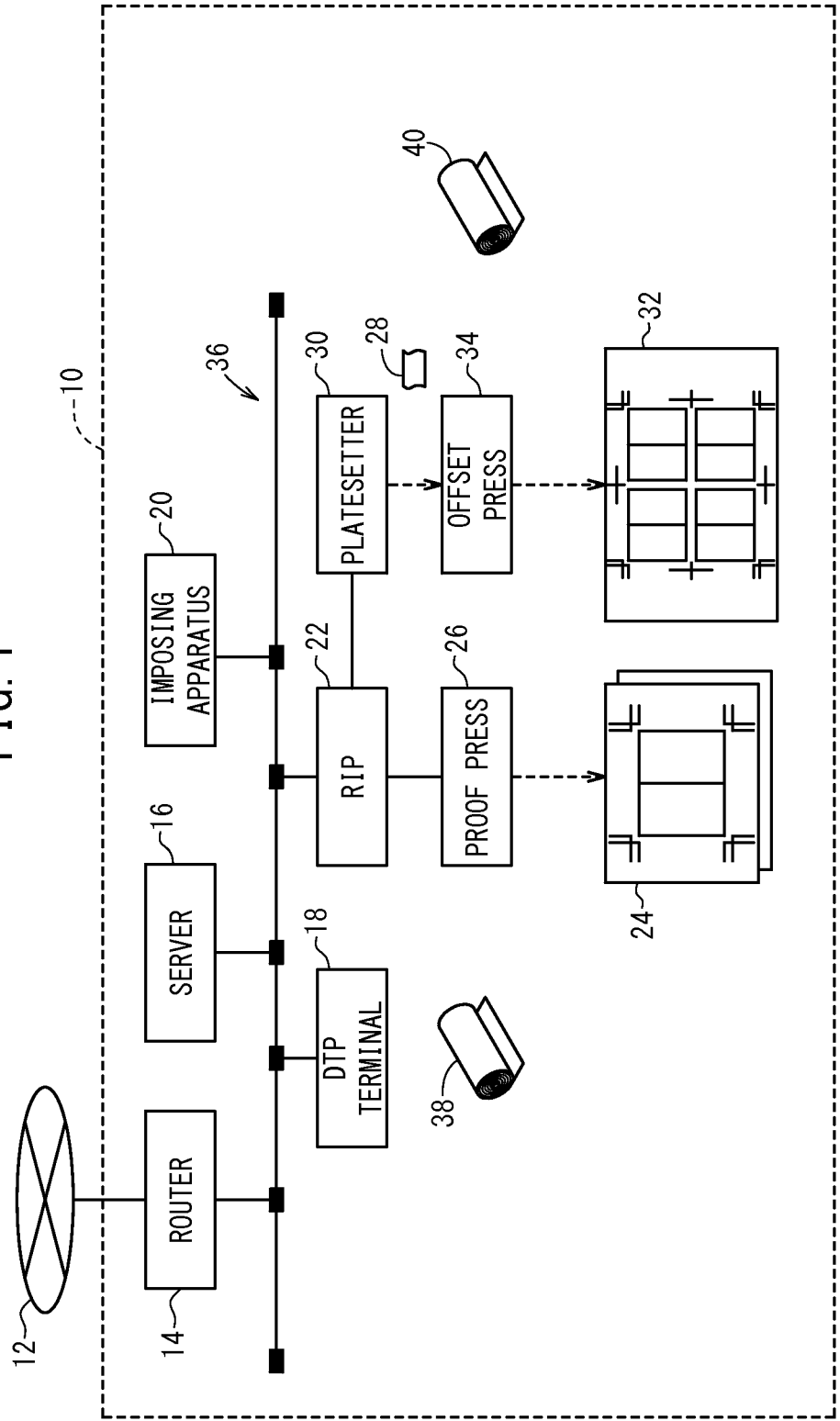
FIG. 1 is a block diagram showing an overall configuration of a print production system incorporating an imposing apparatus according to an embodiment of the present invention.

FIG. 1 shows in block form an overall configuration of a print production system 10 incorporating an imposing apparatus 20 according to an embodiment of the present invention.

As shown in FIG. 1, the print production system 10 includes a router 14 as a device for connecting to a network 12, a server 16 accessible through the network 12 from terminal devices, not shown, that belong to external networks, a desktop publishing (DTP) terminal 18 for performing a DTP process including a process of editing data acquired from the server 16 or the like, an imposing apparatus 20 for imposing content data processed by the DTP terminal 18, a raster image processor (RIP) 22 for performing various image processing processes such as a rasterizing process, a color conversion process, etc. based on output data imposed by the imposing apparatus 20, a proof press 26 for printing a proof 24 based on proofread data sent from the RIP 22, a platesetter 30 for producing printing plates 28 based on platemaking data sent from the RIP 22, and an offset press 34 for producing a print 32 with printing plates 28 mounted in the offset press 34.

The server 16 is a core device for work flow management in the print production system 10. The server 16 is connected for communication with terminal devices of at least one of a designer and a production company, not shown, through the router 14 and the network 12. The server 16 is also connected for communication with the DTP terminal 18, the imposing apparatus 20, and the RIP 22 through a local area network (LAN) 36 that is constructed in the print production system 10.

The server 16 is arranged to perform a function as a file server for storing and transferring various data files, a function as an authority (permissions) management server for managing permissions to tasks that can be carried out by terminals, users, or printing jobs, and a function as a mail server for generating and distributing notice mails at given timings such as the starting and ending of various processes.

The various data files that can be managed by the server 16 as the file server include content data, print data (e.g., platemaking data, printing plate data, or proof data), job tickets, e.g., job definition format (JDF) files, international color consortium (ICC) profiles, color sample data, etc.

The DTP terminal 18 performs a preflight process on content data representing characters, figures, patterns, pictures, etc., and then generates image data per page from the content data thus processed. The imposing apparatus 20 performs an imposing process according to a binding process and a page folding process which have been designated, by referring to the tag information of a job ticket.

The RIP 22 functions as a print processing server for at least one printing press. In FIG. 1, the RIP 22 is connected for communication with the proof press 26 and the platesetter 30. The RIP 22 converts PDL-format data described in a page description language (PDL) (hereinafter also referred to as "page description data") into output data suitable for output devices, and supplies the output data to the proof press 26 or the platesetter 30.

The proof press 26 outputs the proof 24 including images on a proof sheet 38 (print medium) based on proof data supplied from the RIP 22. The proof press 26 may comprise a direct digital color proofer (DDCP), an ink jet color proofer, a low-resolution color laser printer (electrophotographic printer), an ink jet printer, or the like.

The offset press 34 applies inks to one surface or both surfaces of a print sheet 40 (print medium) through the printing plates 28 and intermediate transfer mediums, not shown, to output a print 32 in which the images are formed on the print sheet 40. The offset press 34 may be replaced with a digital printing press for direct printing. The digital printing press may comprise an ink jet printing press, a wide-format printing press, an ink jet color proofer, a color laser printer, or the like.

[Electric Block Diagram of Imposing Apparatus 20]

Figure 2:
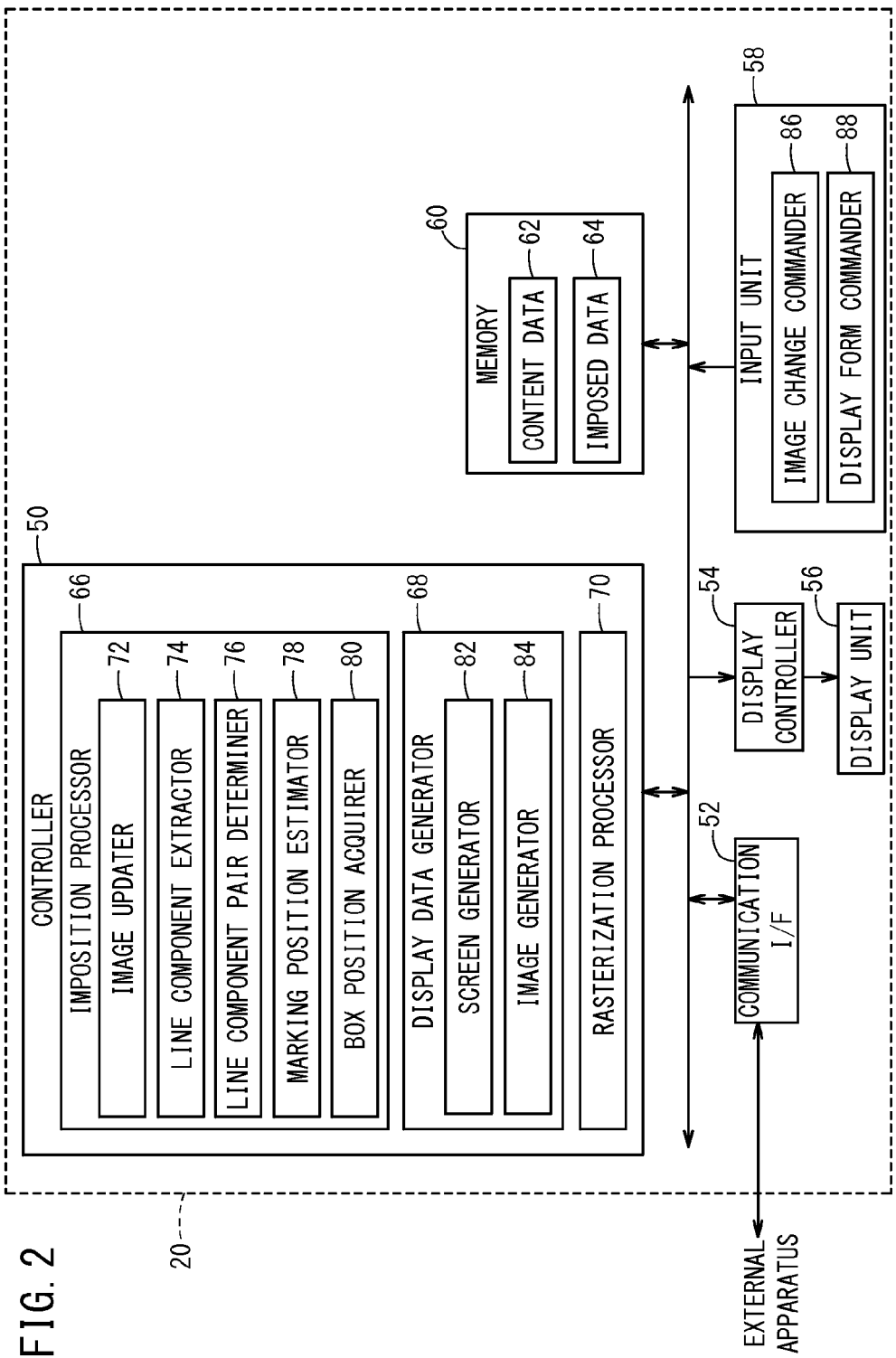
FIG. 2 is an electric block diagram of the imposing apparatus shown in FIG. 1.

FIG. 2 is an electric block diagram of the imposing apparatus 20 shown in FIG. 1. The imposing apparatus 20 comprises a computer including a controller 50, a communication I/F 52, a display controller 54, a display unit 56, an input unit 58, and a memory 60 (storage medium).

The communication I/F 52 is an interface (I/F) for sending electric signals to and receiving electric signals from external apparatus. Through the communication I/F 52, the imposing apparatus 20 can acquire data (e.g., content data 62) from the server 16 (FIG. 1) and supply various data (e.g., imposed data 64) to the server 16.

The display controller 54 comprises a control circuit for controlling the display unit 56 under the control of the controller 50. Specifically, in a case where the display controller 54 outputs a display control signal via an I/F, not shown, to the display unit 56, the display unit 56 is energized to display various images including a window W (see FIGS. 5 and 6).

The memory 60 stores programs and data required for the controller 50 to control various components of the imposing apparatus 20. In FIG. 2, the memory 60 stores content data 62 in PDF and imposed data 64 in JDF.

The memory 60 may comprise a non-transitory computer-readable storage medium. The computer-readable storage medium comprises a portable medium such as a magnetooptic disk, a ROM, a CD-ROM, a flash memory, or the like, or a storage medium such as a hard disk or the like incorporated in a computer system. The storage medium also includes a medium for dynamically holding programs for a short period of time, or a medium for holding programs for a certain period of time.

The controller 50 comprises a processor such as a central processing unit (CPU) or the like. The controller 50 performs various functions including an imposition processor 66, a display data generator 68, and a rasterization processor 70 by reading and executing programs stored in the memory 60.

The imposition processor 66 generates imposed data 64 including settings of a page box, to be described later, based on content data 62 which the imposition processor 66 has acquired. Specifically, the imposition processor 66 includes an image updater 72 for sequentially updating a preview image 122 (FIG. 5, etc.), a line component extractor 74 for extracting a particular line component 172 (FIG. 11) from within a page region 100 (FIG. 4A, etc.), a line component pair determiner 76 for determining a pair 180 of line components (see FIG. 14A, etc.), a marking position estimator 78 for estimating marking positions 166, 168 (FIGS. 7A through 7D) for positioning marks 161 through 164 (FIGS. 7A through 7D), and a box position acquirer 80 for acquiring settings of a page box depending on the positions of frame images 150, 152 (FIG. 6).

The display data generator 68 includes a screen generator 82 for generating a setting screen 120 (FIG. 5, etc.) and an image generator 84 for generating a preview image 122 (FIG. 5, etc.).

The rasterization processor 70 performs a rasterization process on page description data that have been imposed. The rasterization process includes a data format converting process for converting a PDL format into a raster format and a color matching process using ICC profiles.

The input unit 58 comprises various input devices including a mouse, a track ball, a keyboard, a touch sensor, etc. The display function of the display unit 56 and the input function of the input unit 58 are combined into a user interface. The input unit 58 functions as an image change commander 86 for commanding changes in relative positions and sizes of a frame image 130, etc. and stopping such changes, and a display form commander 88 for commanding a display form for the preview image 122.

[Operation of Imposing Apparatus 20]

The imposing apparatus 20 according to the present embodiment is basically configured as described above. Operation of the imposing apparatus 20 shown in FIGS. 1 and 2 will be described in detail below mainly with reference to a flowchart shown in FIG. 3. First, a term "page box" that is required to understand the present invention is defined as follows:

PDF is organized to be able to set page boxes in order to assist in a prepress production workflow. A page box is a parameter that defines the boundaries of a page, and is available in five types including MediaBox, BleedBox, CropBox, TrimBox, and ArtBox.

"MediaBox" (media size) defines a maximum region that can be output of a physical medium serving as a target on which a page is to be printed. "BleedBox" (clipped-off size) defines a region where the contents of a page will be clipped off in a case where output in a production environment. "CropBox" (trimming size) defines a region that will be clipped off in a case where the contents of a page are output. "TrimBox" (finished size) defines dimensions intended of a complete page after being trimmed. "ArtBox" defines a range of meaningful contents on a page intended by the producer.

A designer, who is the creator of the content data 62, enters in advance the values of a "page box" suitable for the layout of an image in a case where the designer submits electronic data. On condition that these values are not entered, then default values have usually been set. The operator confirms whether proper values are set in a page box or not, and needs to correct the settings as necessary. According to the present embodiment, there is provided a function for automatically adjusting settings of a page box depending on an operating action taken by the operator as the user.

Figure 3:
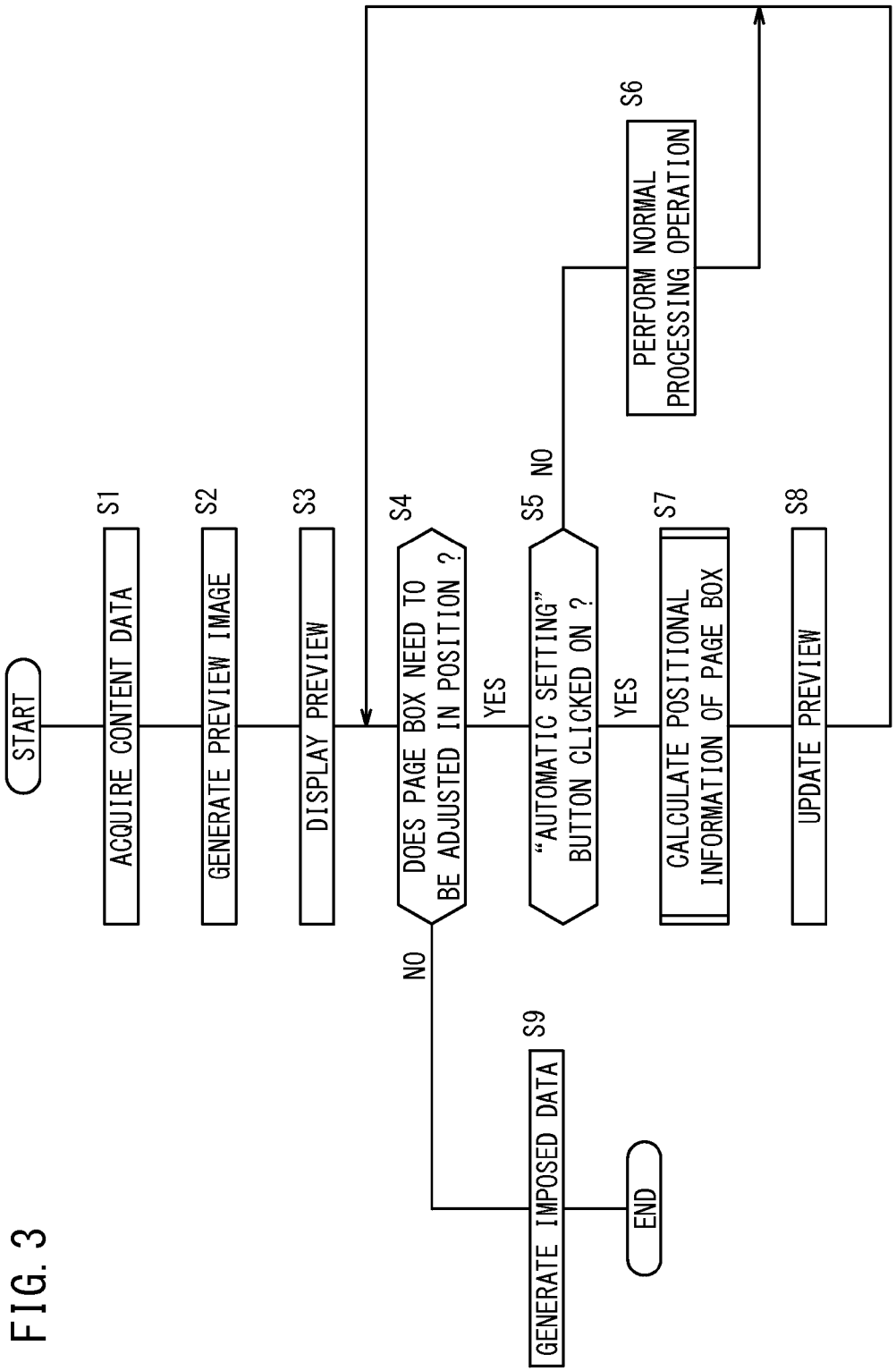
FIG. 3 is a flowchart of an operation sequence of the imposing apparatus shown in FIGS. 1 and 2.

In step S1 shown in FIG. 3, the imposition processor 66 reads content data 62 as an imposition target from the memory 60 or the like, and acquires the content data 62.

Figure 4B:
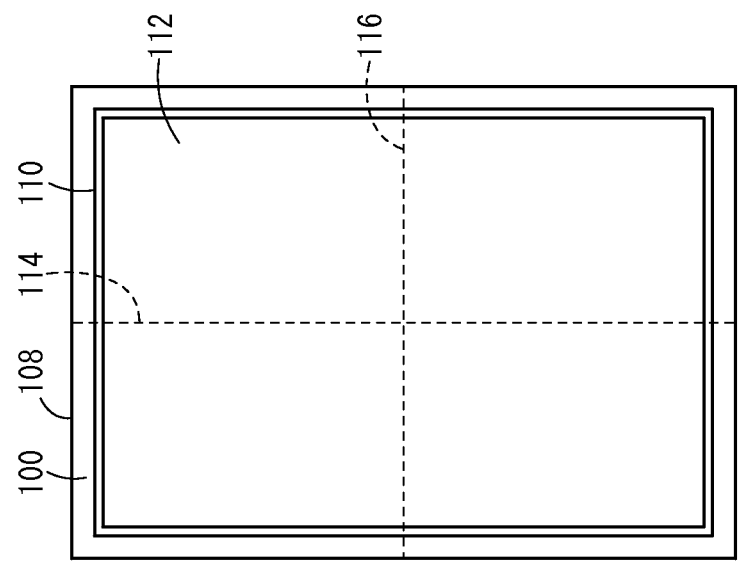
FIG. 4B is a schematic diagram showing the positional relationship between frames or lines that specify the boundaries of the page region shown in FIG. 4A.
Figure 4A:
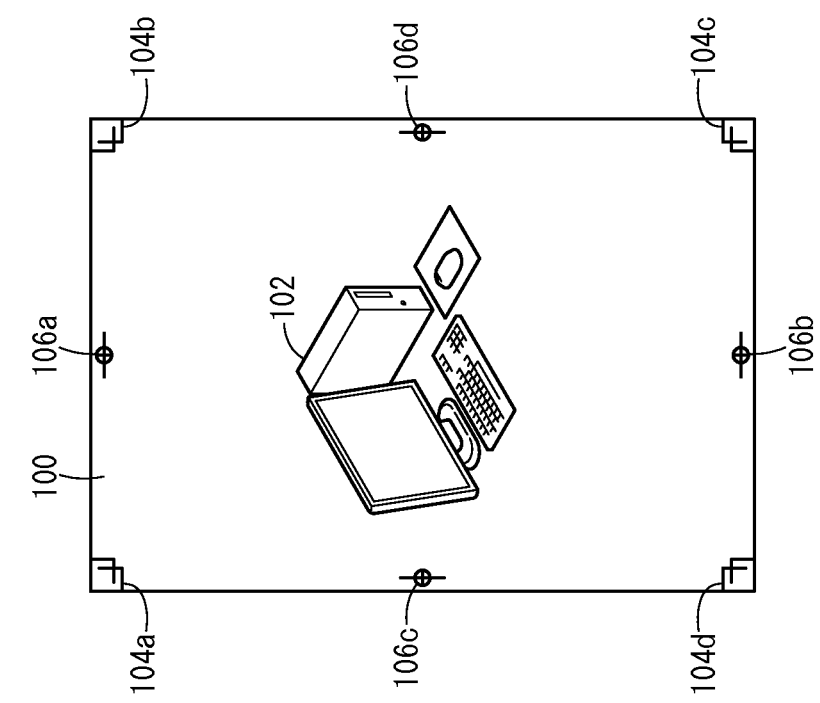
FIG. 4A is a schematic front view of a visual page region represented by content data.

FIG. 4A is a schematic front elevational view of a visual page region 100 represented by content data 62. The page region 100, which is of a rectangular shape, includes a content image 102 showing electronic devices in perspective, four corner register marks 104a through 104d, and four central register marks 106a through 106d.

FIG. 4B is a schematic diagram showing the positional relationship between frames or lines that specify the boundaries of the page region 100 shown in FIG. 4A. The page region 100 has overall boundaries representing a page outer frame 108 in which there exist reference frames 110, 112 and reference lines 114, 116. The reference frame 110 is a rectangular frame that interconnects points (each as a point of intersection between two L-shaped marks) marked by the corner register marks 104a through 104d each shown as a double register mark. The reference frame 112 is a rectangular frame that interconnect other points (each as a vertex of a circumscribing quadrangle near the vertex angles of the L shapes) marked by the double corner register marks 104a through 104d. The reference line 114 is a straight line that extends vertically which interconnects the barycentric positions of the central register marks 106a, 106b. The reference line 116 is a straight line that extends horizontally which interconnects the barycentric positions of the central register marks 106c, 106d.

In step S2, the image generator 84 generates a preview image 122 (see FIG. 5, etc.) based on the content data 62 acquired in step S1. The specific form of the preview image 122 will be described later.

In step S3, the imposing apparatus 20 displays a setting screen 120 to be used in setting a page box. In response to a command for starting a setting process, the screen generator 82 generates display data for the setting screen 120 (including the preview image 122) and then supplies the generated display data to the display controller 54. The display controller 54 displays a window W (including the setting screen 120) on the display unit 56 based on the supplied display data.

As shown in FIG. 5, the setting screen 120 includes a preview image 122, a setting field 124, and a button group 126 indicated "CLOSE" and "SAVE". The operator can enter various settings through the preview image 122 and the setting field 124 by operating the input unit 58 (FIG. 2).

The preview image 122 comprises a page image 128 disposed in the page region 100 (FIG. 4A) and a frame image 130 superposed on the page image 128 as indicating the position of a page box on the page image 128. The frame image 130 is displayed in different display forms for respective types of page boxes at positions corresponding to the respective settings. In the illustrated example, since all the settings of page boxes are identical, an essentially single frame image 130 is shown. The preview image 122 is overlaid with a vertical central line 132 and a horizontal central line 134. The two central lines 132, 134, which are indicated as broken lines, cross each other at the central position of the frame image 130.

An icon group 135 composed of a plurality of tool icons is disposed above the preview image 122. The icon group 135 functions as the display form commander 88 (FIG. 2) for commanding a display form for the preview image 122. Specifically, the preview image 122 can be displayed in any of various display forms including rotation, movement, flipping, and scaling up and down in response to an operating action that is taken by the operator using the icon group 135.

The setting field 124 includes a list table 136 of page boxes, a button 138 indicated "AUTOMATIC SETTING", two pull-down menus 140, 142, a text box group 144, a field 146, and a pull-down menu 148.

The list table 136 has items "NAME" for the names of page boxes, "LEFT" for the minimum values of horizontal (X-axis) coordinates, "LOWER" for the minimum values of vertical (Y-axis) coordinates, "RIGHT" for the maximum values of horizontal (X-axis) coordinates, and "UPPER" for the maximum values of vertical (Y-axis) coordinates from the left to the right thereof. On condition the display colors of the frame image 130 and the list table 136 are unified for each type of page box, then the operator can recognize the present position and settings of a page box at a glance.

The pull-down menu 140 is a control for alternatively setting the type of a page box (MediaBox in FIG. 5) as a reference for the central lines 132, 134. The pull-down menu 142 is a control for setting the size (Kiku-ban in FIG. 5, which is one of standard sizes of paper in Japan) of MediaBox.

The text box group 144 is a control for setting the position of a page box. Using the text box group 144, the operator can enter as text the values (unit: mm) of "LEFT", "LOWER", "RIGHT", and "UPPER" that are defined in the same manner as the list table 136. The values entered through the text box group 144 are linked to the position of the frame image 130, so that in a case where one of the images is changed in position, the other image follows it to change its position.

The field 146 displays the width and height (unit: mm) of a page box. The displayed width (668.98) is calculated as "RIGHT (668.98)"–"LEFT (0.00)", and the displayed height (915.59) is calculated as "UPPER (915.59)"–"LOWER (0.00)".

The list table 136 has five lines indicating respective page boxes with a selection frame 149 being applied to one of them. The type of the page box that is surrounded by the selection frame 149, i.e., the "finished size", has its settings made effective. In other words, the present settings of the "finished size" are displayed in the text box group 144 and the field 146. The positions of the central lines 132, 134 are determined based on these settings.

In step S4, the operator judges whether the page box needs to be adjusted in position or not, while viewing the preview image 122 shown in FIG. 5. In the example shown in FIG. 5, since the settings of the page box are not appropriate settings, the operator judges that the page box needs to be adjusted in position (step S4: YES), and control goes to next step S5.

In step S5, the imposition processor 66 judges whether the "AUTOMATIC SETTING" button 138 in the setting screen 120 shown in FIG. 5 has been clicked on or not. On condition the imposition processor 66 judges that the "AUTOMATIC SETTING" button 138 has not been clicked on, then a normal processing operation is performed in step S6, after which control goes back to step S4. On condition the imposition processor 66 judges that the "AUTOMATIC SETTING" button 138 has been clicked on, then control goes to step S7.

In step S7, the imposition processor 66 analyzes the content data 62 acquired in step S1, thereby calculating the positional information of a certain type of page box. The calculating process will be described later.

In step S8, the imposing apparatus 20 updates the preview image 122 depending on the positional information calculated in step S7. Specifically, the image updater 72 acquires the positional information of the page box, and supplies the acquired positional information to the image generator 84, thereby instructing it to update the preview image 122. Thereafter, based on the supplied positional information, the image generator 84 newly generates a preview image 122 that represents the frame image 130 in a moved or deformed form. The imposing apparatus 20 now displays a frame image 150, etc. which has followed at least one of a changed position and size.

FIG. 6 is a view showing a second image that represents a setting screen 120 for a page box. The setting screen 120 shown in FIG. 6 is different from the setting screen 120 shown in FIG. 5 in that a frame image 150 representing a "finished size" and a frame image 152 representing a "clipped-off size" have been adjusted. As a result of the frame images 150, 152 that have been adjusted in at least one of position and size, the values shown in the list table 136 (particularly, the values in the selection frame 149), the text box group 144, and the field 146 are changed.

The pull-down menu 148 is a control for selecting which page region (including the page region 100) the present settings are to be set in. For example, the pull-down menu 148 allows the operator to select either one of "ALL", "ODD-NUMBERED", "EVEN-NUMBERED", and "DESIGNATE RANGE" (including only the corresponding page).

After step S6 or step S8 has been carried out, control goes back to step S4, and the page box is continuously adjusted in position in steps S4 through S8 as necessary. The page box may positionally be adjusted not only automatically as described above, but also manually by the operator, for example. On condition the operator judges that the page box does not need to be adjusted in position in step S4 (step S4: NO), then control goes to step S9.

In step S9, the imposition processor 66 generates imposed data 64 by updating the settings of the page box. Before the imposition processor 66 generates imposed data 64, the box position acquirer 80 acquires the positional information of the page box set in the setting screen 120, in association with the page region 100. On condition there are a plurality of page regions, for example, then the box position acquirer 80 may acquire the positional information further in association with at least one page region which is not to be displayed in the preview image 122.

The imposition processor 66 generates imposed data 64 that includes the positional information acquired by the box position acquirer 80, and stores and saves the generated imposed data 64 in the memory 60. Thereafter, the imposing apparatus 20 may send out the imposed data 64 via the communication I/F 52 so that the imposed data 64 will be stored in the server 16.

[Process of Calculating Positional Information]

The process of calculating the positional information of a page box (step S7 in FIG. 3) will be described below with reference to FIGS. 7A through 13B.

FIGS. 7A through 7D are enlarged plan views of typical positioning marks 161 through 164. Each of the positioning marks 161 (FIG. 7A), 162 (FIG. 7B), 163 (FIG. 7C) is made up of two vertical lines and two horizontal lines. The positioning mark 164 (FIG. 7D) is made up of a vertical line and a horizontal line.

Each of the positioning marks 161 through 164 marks two encircled positions (hereinafter referred to as "marking positions 166, 168") based on the positional relationship between two feature points 165A, 165B. The marking position 166 corresponds to a vertex that specifies a finished region, whereas the marking position 168 corresponds to a vertex that specifies a clipped-off region. As can be seen from FIGS. 7A through 7D, the feature points 165A, 165B are axisymmetric with respect to an axis 170 that interconnects the marking positions 166, 168. This is because generally a clipped-off width (also referred to as bleed width) is set to the same value in both horizontal and vertical directions.

Using the above geometric features, the marking positions 166, 168 of the positioning marks 161 through 164 can be detected to a nicety even though the positioning marks 161 through 164 are of different forms. Operation of the imposition processor 66 that carries out the calculating process will be described in detail below with reference to a flowchart shown in FIG. 8.

Figure 8:
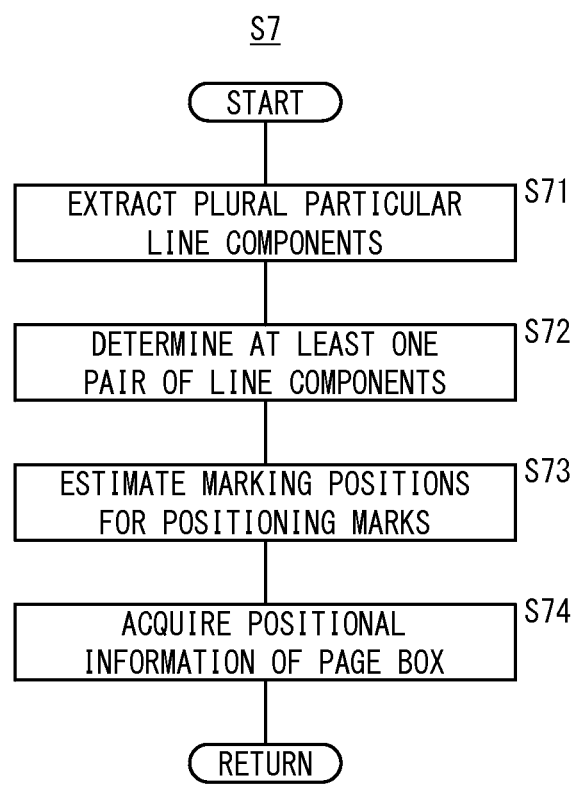
FIG. 8 is a detailed flowchart of a process of acquiring the positional information of a page box.

In step S71 shown in FIG. 8, the line component extractor 74 extracts a plurality of particular line components 172 from within the page region 100. A particular line component 172 signifies a line component having a particular color and extending along a particular direction. For example, the line component extractor 74 extracts line components having a solid color (a single color having a gradation level 100%) and extending along a vertical direction or a horizontal direction.

Figure 9:
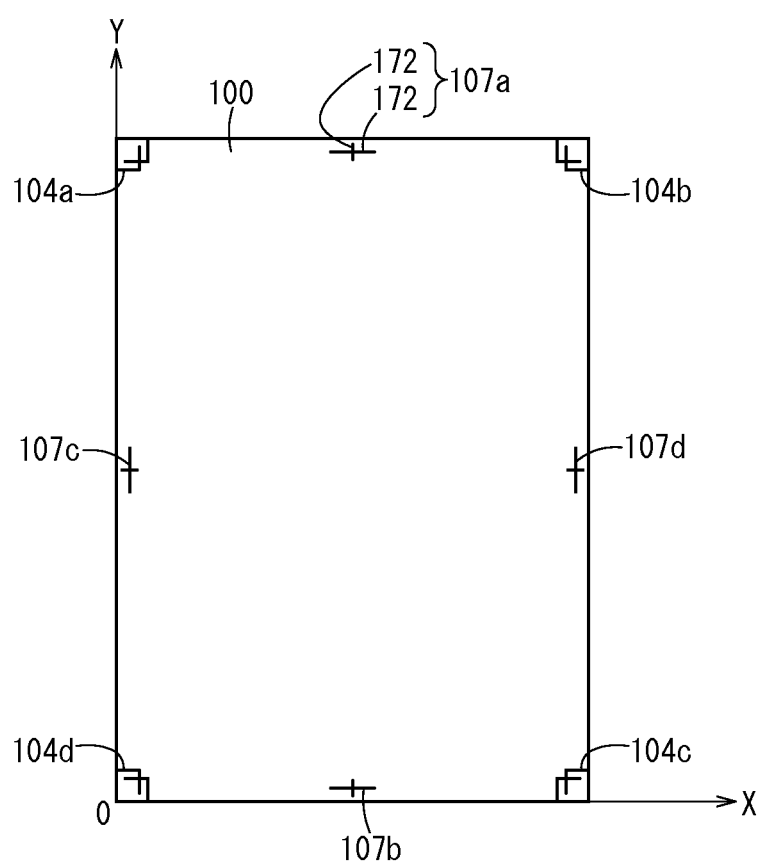
FIG. 9 is a diagram showing particular line components extracted from the page region shown in FIG. 4A.

FIG. 9 is a diagram showing particular line components 172 extracted from the page region 100 shown in FIG. 4A. As can be understood from FIG. 9, line components making up four central register marks 107a through 107d (part of the central register marks 106a through 106d) in addition to the four corner register marks 104a through 104d, i.e., particular line components 172, are extracted. The central register mark 107a is made up of two particular line components 172, or more specifically, a longer horizontal line component and a shorter vertical line component.

Thereafter, the line component extractor 74 acquires the coordinates (x, y) of end points 174, 176 of each of the particular line components 172. The lower left corner of the page region 100 is defined as an origin O, the horizontal direction thereof is defined as an X-axis, and the vertical direction thereof is defined as a Y-axis.

FIG. 10A is a diagram showing the coordinates of a first end point and a second end point of each of the particular line components 172. The first end point is the end point 174 that is closer to the origin O, among the two end points 174, 176. The second end point is the end point 176 that is remoter from the origin O, among the two end points 174, 176.

As shown in FIG. 10A, twelve "vertical line components" and twelve "horizontal line components" are extracted from within the page region 100 (FIG. 4A). It should be noted that it is not necessary in the extracting process to detect which register mark each particular line component 172 makes up.

In step S72 shown in FIG. 8, the line component pair determiner 76 determines at least one pair 180 of line components based on the positional relationship between the particular line components 172 extracted in step S71. The line component pair determiner 76 performs a processing sequence comprising three steps of [1] excluding a single component, [2] calculating evaluation values, and [3] determining a pair.

[1] First, the line component pair determiner 76 refers to the coordinates of the end points 174, 176 and excludes only a single component that cannot make up the positioning marks 161 through 164. Specifically, the line component pair determiner 76 excludes "vertical line components" where end points 174 with identical x coordinates are not present, and excludes "horizontal line components" where end points 174 with identical y coordinates are not present. As a result, as shown in an upper section of FIG. 10B, two particular line components 172, i.e., a vertical line component of the central register mark 107c and a vertical line component of the central register mark 107d, are excluded. Similarly, as shown in a lower section of FIG. 10B, two particular line components 172, i.e., a horizontal line component of the central register mark 107a and a horizontal line component of the central register mark 107b, are excluded.

[2] Then, the line component pair determiner 76 calculates evaluation values for determining a pair (a pair 180 of line components) whose two end points are axisymmetric with respect to the axis 170, among the particular line components 172 that have remained unexcluded. The axis 170 represents an axis line that extends obliquely 45 degrees to the horizontal direction (X-axis) and the vertical direction (Y-axis).

Various algorithms including algebraic and geometric processes can be employed as a process of judging axisymmetry. According to a geometry process, a particular line component 172 may be flipped across the axis 170 and it may be judged whether there exist a pair 180 of line components whose end points are superposed in position or not. One preferred algebraic process will be described in detail below with reference to FIGS. 11 through 13B. Generally, on condition the end points (end points 174 or end points 176) of two particular line components 172 are present on a common straight line 178 perpendicular to the axis 170, then the line component pair determiner 76 judges that the end points are axisymmetric with respect to the axis 170. Stated otherwise, the line component pair determiner 76 determines a pair 180 of line components where the angle formed between a straight line interconnecting the end points of the two particular line components 172 and the X-axis (or Y-axis) is 45 degrees.

Figure 11:
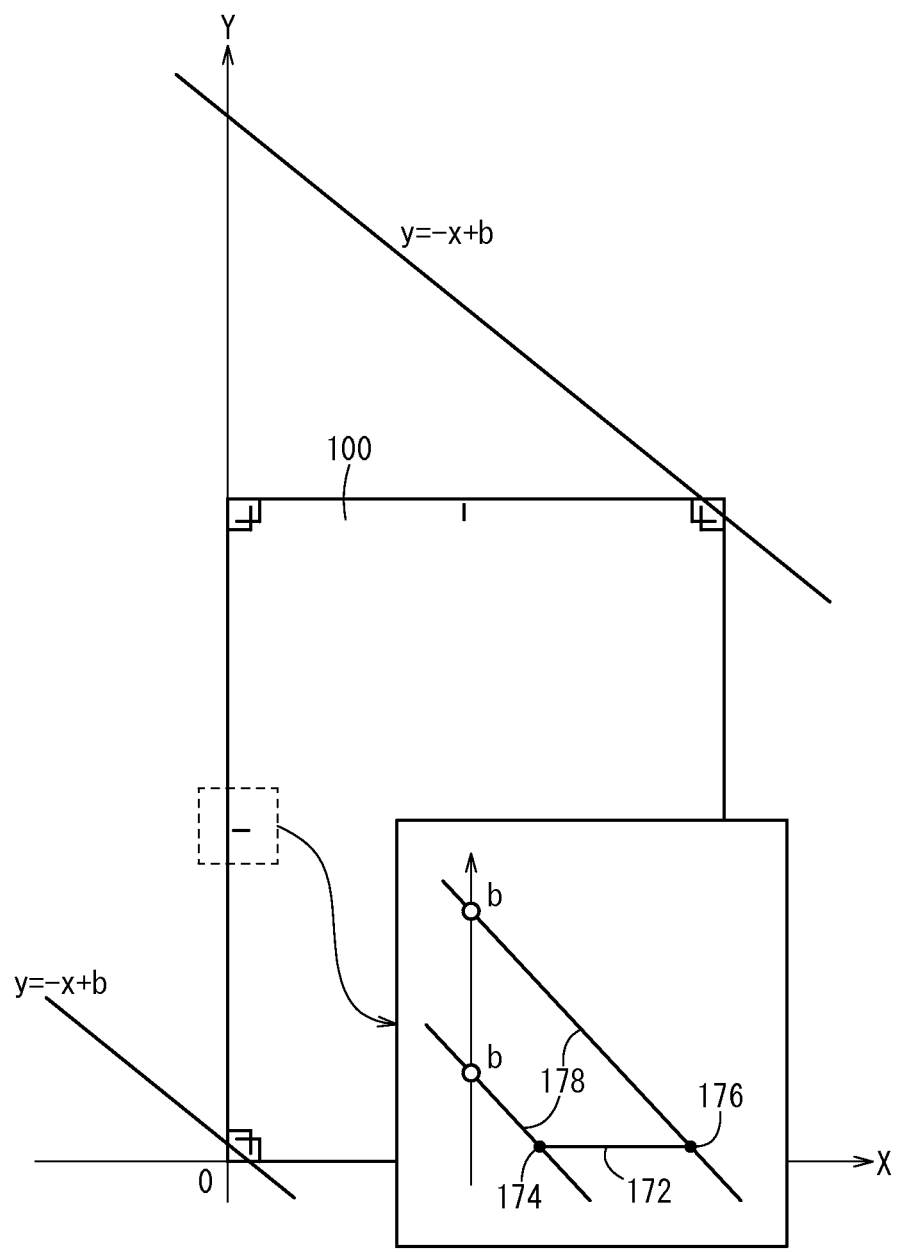
FIG. 11 is a schematic diagram illustrating a process of calculating intercepts of straight lines passing through end points.

FIG. 11 is a schematic diagram illustrating a process of calculating intercepts b of straight lines 178 passing through end points 174, 176. The straight lines 178 are straight lines that are perpendicular to the axis 170 whose gradient on XY coordinates is 1 and that are represented by a function y=−x+b (b is any real number). Since the coordinates of the points (end points 174, 176) through which the straight lines 178 extend are known, the intercepts b as unknowns can uniquely be determined.

FIG. 12 is a diagram showing a first intercept and a second intercept that are obtained according to the calculating process illustrated in FIG. 11. The first intercept is the intercept b of the straight line 178 that extends through the first end point (end point 174), and the second intercept is the intercept b of the straight line 178 that extends through the second end point (end point 176).

[3] Then, the line component pair determiner 76 determines a pair 180 of line components from the calculated evaluation values (intercepts b). A process of determining such a pair 180 of line components will be described below with reference to FIGS. 13A and 13B.

Figures 13A, 13B:
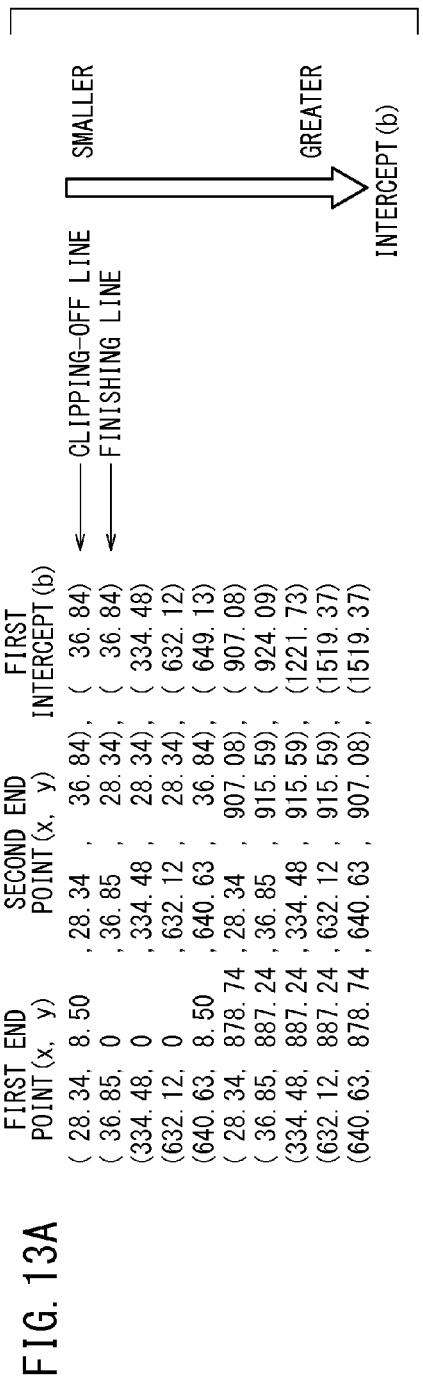
FIG. 13A is a schematic diagram illustrating a process of determining a pair of line components included in a corner register mark at the lower left corner of a page region.
FIG. 13B is a schematic diagram illustrating a process of determining a pair of line components included in a corner register mark at the upper right corner of a page region.

FIG. 13A is a schematic diagram illustrating a process of determining a pair 180 of line components included in the corner register mark 104d at the lower left corner of the page region 100. FIG. 13A corresponds to the list of data of "vertical line components" shown in FIG. 12 which are shuffled in an ascending order of first intercepts.

Specifically, the line component pair determiner 76 determines, as a pair 180 of line components, two particular line components 172 where (1) the intercepts b are equal to each other or fall in an allowable tolerance range (e.g.,2 mm) between the particular line components 172, (2) the distance between the second end points (end points 176) thereof is smaller than a threshold value (e.g., 10 mm), and (3) the intercepts b are of minimum values.

Then, the line component pair determiner 76 identifies one of the pair 180 of line components whose x coordinate is smaller (outward one in the page region 100) as a "clipping-off line 172b", and identifies one of the pair 180 of line components whose x coordinate is greater (inward one in the page region 100) as a "finishing line 172t".

The clipping-off line 172b has a first end point whose coordinates are (28.34, 8.50) and a second end point whose coordinates are (28.34, 36.84). The finishing line 172t has a first end point whose coordinates are (36.85, 0) and a second end point whose coordinates are (36.85, 28.34).

FIG. 13B is a schematic diagram illustrating a process of determining a pair 180 of line components included in the corner register mark 104b at the upper right corner of the page region 100. FIG. 13B corresponds to the list of data of "vertical line components" shown in FIG. 12 which are shuffled in an ascending order of second intercepts.

Specifically, the line component pair determiner 76 determines, as a pair 180 of line components, two particular line components 172 where (1) the intercepts b are equal to each other or fall in an allowable tolerance range between the particular line components 172, (2) the distance between the first end points (end points 174) thereof is smaller than a threshold value (e.g., 10 mm), and (3) the intercepts b are of maximum values.

Then, the line component pair determiner 76 identifies one of the pair 180 of line components whose x coordinate is greater (outward one in the page region 100) as a "clipping-off line 172b", and identifies one of the pair 180 of line components whose x coordinate is smaller (inward one in the page region 100) as a "finishing line 172t".

The clipping-off line 172b has a first end point whose coordinates are (640.63, 878.74) and a second end point whose coordinates are (640.63, 907.08). The finishing line 172t has a first end point whose coordinates are (632.12, 887.24) and a second end point whose coordinates are (632.12, 915.59).

In this manner, the line component pair determiner 76 determines two pairs 180 of line components included respectively in the corner register marks 104b, 104d based on the positional relationship between the vertical line components. In conjunction with this or aside from this, the line component pair determiner 76 determines two pairs 180 of line components included respectively in the corner register marks 104b, 104d based on the positional relationship between the horizontal line components.

Though the line component pair determiner 76 determines a pair 180 of line components where the two particular line components 172 are parallel to each other, the present invention is not limited to such a process. Specifically, the line component pair determiner 76 may determine a pair 180 of line components where the two particular line components 172 are perpendicular to each other. This increases variations of forms that can be detected (e.g., the positioning mark 164 shown in FIG. 7D).

In step S73 shown in FIG. 8, the marking position estimator 78 estimates marking positions 166, 168 for positioning marks 161 through 164 based on the shape of the pair 180 of line components determined in step S72.

FIGS. 14A and 14B are schematic diagrams illustrating processes of estimating marking positions 166, 168 based on the shapes of pairs 180 of line components.

FIG. 14A is concerned with a process of estimating marking positions 166, 168 based on a pair 180 of line components that extend vertically. The pair 180 of line components is composed of a clipping-off line 172b whose end point 176b has coordinates (x1, y1) and a finishing line 172t whose end point 176t has coordinates (x2, y2). The marking position 166 has coordinates that are estimated as (x2, y1), and the marking position 168 has coordinates that are estimated as (x1, y2).

FIG. 14B is concerned with a process of estimating marking positions 166, 168 based on a pair 180 of line components that extend horizontally. The pair 180 of line components is composed of a clipping-off line 172b whose end point 176b has coordinates (x2, y2) and a finishing line 172t whose end point 176t has coordinates (x1, y1). The marking position 166 has coordinates that are estimated as (x2, y1), and the marking position 168 has coordinates that are estimated as (x1, y2).

In this fashion, the marking position estimator 78 estimates the marking positions 166, 168 for the corner register marks 104d at the two corners based on the shapes of the pairs 180 of line components.

With respect to the positioning mark 161 shown in FIG. 7A, the marking position estimator 78 can estimate the marking positions 166, 168 using either one of the pairs 180 of line components shown in FIGS. 14A and 14B. With respect to the positioning marks 162 (FIG. 7B), 163 (FIG. 7C), it should be noted that the marking position estimator 78 can estimate the marking positions 166, 168 using both the pairs 180 of line components along the vertical and horizontal directions. With respect to the positioning mark 164 (FIG. 7D), it should be noted that the marking position estimator 78 can estimate the marking positions 166, 168 using a pair 180 of a vertical line component and a horizontal line component.

In step S74 shown in FIG. 8, the box position acquirer 80 temporarily acquires positional information of a particular type of page box based on the marking positions 166, 168 estimated in step S73. Specifically, the box position acquirer 80 acquires four parameters (values of "LEFT", "LOWER", "RIGHT", and "UPPER") that specify a "finished region" from the two coordinates representing the marking position

166. In conjunction with this or aside from this, the box position acquirer 80 acquires four parameters (values of "LEFT", "LOWER", "RIGHT", and "UPPER") that specify a "clipped-off region" from the two coordinates representing the marking position 168.

As described above, the imposition processor 66 automatically calculates the positional information of the page box (see step S7 shown in FIG. 3).

[Advantages of the Embodiment]

The imposing apparatus 20 according to the present embodiment is an apparatus for setting, for each page region 100, a page box that specifies the boundaries of a page. The imposing apparatus 20 includes the line component extractor 74 for extracting a plurality of particular line components 172 from within the page region 100, the line component pair determiner 76 for determining at least one pair 180 of line components included in positioning marks 161 through 164 based on the positional relationship between the line components 172, the marking position estimator 78 for estimating marking positions 166, 168 for the positioning marks 161 through 164 based on the shape of the pair 180 of line components, and the box position acquirer 80 for acquiring the marking positions 166, 168 as the positional information of a page box in association with the page region 100.

The imposing apparatus 20 thus determines at least one pair 180 of line components included in the positioning marks 161 through 164 based on the positional relationship between the particular line components 172, and estimates marking positions 166, 168 for positioning marks 161 through 164 based on the shape of the pair 180 of line components. Generally speaking, the positioning marks 161 through 164 have a form including the pair 180 of line components, and perform a function to mark a two-dimensional position based on end points, points of intersection, etc. thereof. Using these geometric features, the marking positions 166, 168 can be detected to a nicety even though the positioning marks 161 through 164 are of different forms, and a page box can be set automatically and accurately.

The present invention is not limited to the above embodiment, but the embodiment can be changed and modified freely without departing from the scope of the invention.

What is claimed is:

1. An imposing apparatus for setting, for each page region, a page box that specifies boundaries of a page, comprising:
   a line component extractor for extracting a plurality of particular line components from within the page region;
   a line component pair determiner for determining at least one pair of line components included in positioning marks based on a positional relationship between the particular line components extracted by the line component extractor;
   a marking position estimator for estimating marking positions for the positioning marks based on a shape of the pair of line components determined by the line component pair determiner; and
   a box position acquirer for acquiring the marking positions estimated by the marking position estimator as positional information of the page box in association with the page region,
   wherein the positioning marks are made up of two vertical lines and two horizontal lines or one vertical line and one horizontal line, and mark two of the marking positions based on a positional relationship between feature points of one or two vertical lines and one or two horizontal lines, and
   the feature points are axisymmetric with respect to an axis that interconnects two of the marking positions.

2. The imposing apparatus according to claim 1, wherein the line component extractor extracts line components which extend along a horizontal direction or a vertical direction in the page region as the particular line components; and
   the line component pair determiner determines the pair of line components where an angle formed between a straight line interconnecting end points of two of the particular line components and the horizontal direction is 45 degrees.

3. The imposing apparatus according to claim 2, wherein the line component pair determiner determines the pair of line components on condition a distance between two of the end points is smaller than a threshold value.

4. The imposing apparatus according to claim 2, wherein the line component pair determiner determines the pair of line components where two of the particular line components are parallel to each other.

5. The imposing apparatus according to claim 2, wherein the line component pair determiner determines the pair of line components where two of the particular line components are perpendicular to each other.

6. The imposing apparatus according to claim 1, wherein the box position acquirer acquires the positional information of the page box which specifies at least one of a clipped-off region and a finished region.

7. A method of setting, for each page region, a page box that specifies boundaries of a page, the method enabling a computer to perform the steps of:
   extracting a plurality of particular line components from within the page region;
   determining at least one pair of line components included in positioning marks based on a positional relationship between the extracted particular line components;
   estimating marking positions for the positioning marks based on a shape of the determined pair of line components; and
   acquiring the estimated marking positions as positional information of the page box in association with the page region,
   wherein the positioning marks are made up of two vertical lines and two horizontal lines or one vertical line and one horizontal line, and mark two of the marking positions based on a positional relationship between feature points of one or two vertical lines and one or two horizontal lines, and
   the feature points are axisymmetric with respect to an axis that interconnects two of the marking positions.

8. A non-transitory storage medium storing an imposing program for setting, for each page region, a page box that specifies boundaries of a page, the imposing program enabling a computer to perform the steps of:
   extracting a plurality of particular line components from within the page region;
   determining at least one pair of line components included in positioning marks based on a positional relationship between the extracted particular line components;
   estimating marking positions for the positioning marks based on a shape of the determined pair of line components; and
   acquiring the estimated marking positions as positional information of the page box in association with the page region,
   wherein the positioning marks are made up of two vertical lines and two horizontal lines or one vertical line and one horizontal line, and mark two of the marking positions based on a positional relationship between feature points of one or two vertical lines and one or two horizontal lines, and the feature points are axisymmetric with respect to an axis that interconnects two of the marking positions.

* * * * *